US012155718B2

(12) United States Patent
Chen et al.

(10) Patent No.: US 12,155,718 B2
(45) Date of Patent: Nov. 26, 2024

(54) DEPLOYING A DISTRIBUTED LOAD BALANCER IN A VIRTUALIZED COMPUTING SYSTEM

(71) Applicant: VMware, Inc., Palo Alto, CA (US)

(72) Inventors: DongPing Chen, Beijing (CN); Jingchun Jiang, Beijing (CN); Bo Lin, Beijing (CN); Xinyang Liu, Beijing (CN); Donghai Han, Beijing (CN); Xiao Liang, Beijing (CN); Yi Zeng, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/185,784

(22) Filed: Mar. 17, 2023

(65) Prior Publication Data
US 2024/0251010 A1   Jul. 25, 2024

(30) Foreign Application Priority Data

Jan. 19, 2023   (WO) .............. PCT/CN2023/000026

(51) Int. Cl.
*H04L 67/101* (2022.01)
*G06F 9/455* (2018.01)
*H04L 67/1008* (2022.01)

(52) U.S. Cl.
CPC ........ *H04L 67/101* (2013.01); *G06F 9/45558* (2013.01); *H04L 67/1008* (2013.01); *G06F 2009/45595* (2013.01)

(58) Field of Classification Search
CPC .............. H04L 67/101; H04L 67/1008; G06F 9/45558; G06F 2009/45595

USPC ........................................................ 709/203
See application file for complete search history.

(56) References Cited

U.S. PATENT DOCUMENTS

| | | | |
|---|---|---|---|
| 9,055,076 B1 * | 6/2015 | Sorenson, III ...... | H04L 67/1008 |
| 9,807,157 B2 * | 10/2017 | Mortsolf ............. | H04L 67/1001 |
| 10,334,034 B2 * | 6/2019 | Zhao ..................... | H04L 67/101 |
| 11,165,856 B2 * | 11/2021 | Baradaran ............. | H04L 41/142 |
| 11,171,834 B1 * | 11/2021 | Bockelmann ....... | G06F 9/44505 |
| 11,201,800 B2 * | 12/2021 | Natal ...................... | H04L 47/10 |
| 11,252,655 B1 * | 2/2022 | Gupta ....................... | G06F 8/63 |
| 11,412,053 B2 * | 8/2022 | Yang .................. | G06F 9/45558 |
| 11,422,842 B2 * | 8/2022 | Choudhary ......... | G06F 9/45533 |
| 11,451,643 B2 * | 9/2022 | Magerramov ...... | H04L 63/0428 |
| 11,463,355 B2 * | 10/2022 | Kreger-Stickles ...... | H04L 47/18 |

(Continued)

FOREIGN PATENT DOCUMENTS

| | | | | |
|---|---|---|---|---|
| EP | 3316532 A1 * | 5/2018 | ............. | H04L 49/70 |
| KR | 20160119365 A | * 10/2016 | | |

*Primary Examiner* — Melvin H Pollack
(74) *Attorney, Agent, or Firm* — Kim & Stewart LLP

(57) ABSTRACT

An example method of distributed load balancing in a virtualized computing system includes: configuring, at a logical load balancer, a traffic detector to detect traffic to a virtual internet protocol address (VIP) of an application having a plurality of instances; detecting, at the traffic detector, a first request to the VIP from a client executing in a virtual machine (VM) supported by a hypervisor executing on a first host; sending, by a configuration distributor of the logical load balancer in response to the detecting, a load balancer configuration to a configuration receiver of a local load balancer executing in the hypervisor for configuring the local load balancer to perform load balancing for the VIP at the hypervisor using the load balancer configuration.

20 Claims, 6 Drawing Sheets

(56) References Cited

U.S. PATENT DOCUMENTS

| | | | |
|---|---|---|---|
| 11,470,119 B2* | 10/2022 | Bansal | H04L 41/0806 |
| 11,516,126 B2* | 11/2022 | Tracy | H04L 45/566 |
| 11,573,839 B1* | 2/2023 | Tsai | H04L 67/10 |
| 11,635,995 B2* | 4/2023 | Bahl | G06F 9/3877 |
| | | | 718/104 |
| 11,652,749 B2* | 5/2023 | Degrace | H04L 67/1095 |
| | | | 709/238 |
| 11,665,242 B2* | 5/2023 | Kancherla | H04L 67/141 |
| | | | 709/203 |
| 11,695,692 B2* | 7/2023 | Shilimkar | H04L 61/2514 |
| | | | 709/224 |
| 11,716,393 B1* | 8/2023 | Qiao | H04L 67/141 |
| | | | 709/227 |
| 11,740,921 B2* | 8/2023 | Olmsted-Thompson | G06F 9/5077 |
| | | | 718/1 |
| 11,743,182 B2* | 8/2023 | Sharma | H04L 41/0803 |
| | | | 709/238 |
| 11,743,233 B2* | 8/2023 | King | H04L 45/7453 |
| | | | 709/245 |
| 11,743,325 B1* | 8/2023 | Dunsmore | H04L 67/52 |
| | | | 709/203 |
| 11,777,897 B2* | 10/2023 | Baker | H04L 61/2557 |
| | | | 709/245 |
| 11,799,782 B2* | 10/2023 | Degrace | H04L 49/70 |
| 11,843,527 B2* | 12/2023 | Momchilov | H04L 67/141 |
| 2016/0147548 A1* | 5/2016 | Itsumi | G06F 9/5083 |
| | | | 718/1 |
| 2018/0176289 A1* | 6/2018 | Watanabe | H04L 67/1008 |
| 2022/0171649 A1* | 6/2022 | Green | G06F 9/44505 |
| 2022/0263791 A1* | 8/2022 | Brar | H04L 45/74 |
| 2023/0031963 A1* | 2/2023 | Guchhait | G06F 11/3409 |
| 2023/0048343 A1* | 2/2023 | Hullahalli | G06F 21/64 |
| 2023/0094159 A1* | 3/2023 | Difranco | G06F 9/5072 |
| | | | 718/1 |
| 2023/0107891 A1* | 4/2023 | Miriyala | G06F 9/5044 |
| | | | 370/254 |
| 2023/0124827 A1* | 4/2023 | Dornemann | G06F 9/45558 |
| | | | 711/162 |
| 2023/0251888 A1* | 8/2023 | Belleau | G06F 9/45558 |
| | | | 718/1 |
| 2023/0315503 A1* | 10/2023 | Lu | G06F 16/256 |
| | | | 718/1 |

* cited by examiner

```
0 1 2 3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 0x0104  |0 Type  |R|R|R|1 1 0 0 0|
+-+-+-+-+-+-+-+-+-+-+-+-+-+-+-+-+-+-+-+-+-+-+-+-+-+-+-+-+-+-+-+-+
| Distributor IP |
+-+-+-+-+-+-+-+-+-+-+-+-+-+-+-+-+-+-+-+-+-+-+-+-+-+-+-+-+-+-+-+-+
| Virtual IP |
+-+-+-+-+-+-+-+-+-+-+-+-+-+-+-+-+-+-+-+-+-+-+-+-+-+-+-+-+-+-+-+-+
| Distributor Port |
+-+-+-+-+-+-+-+-+-+-+-+-+-+-+-+-+-+-+-+-+-+-+-+-+-+-+-+-+-+-+-+-+
```

FIG. 6

DEPLOYING A DISTRIBUTED LOAD BALANCER IN A VIRTUALIZED COMPUTING SYSTEM

CROSS-REFERENCE

This application is based upon and claims the benefit of priority from International Patent Application No. PCT/CN2023/000026, filed on Jan. 19, 2023, the entire contents of which are incorporated herein by reference.

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. Hosts can be organized into clusters ("host clusters") and managed by a virtualization management server. A physical network connecting the hosts can also be virtualized to provide a software-defined network (SDN).

An SDN can include a distributed load balancer, which is a load balancer that includes components distributed to the client side. There can be multiple clients accessing backend servers behind the distributed load balancer and the load balancer configuration must be pushed to multiple nodes having the clients. An administrator must know all potential clients and where the clients execute to ensure that client-side load balancing components are properly configured. For example, an administrator can manage a group of hosts and deploy distributed load balancer components and configuration to these hosts. Each client of the load-balanced service needs its host to be added to the group. This method is static, manual, and difficult to maintain. An alternative method is for the administrator to assume all hosts require distributed load balancer components and corresponding configuration. But this method increases the size of the configuration data and has significant impact on the scale of the distributed load balancer.

SUMMARY

In embodiments, a method of distributed load balancing in a virtualized computing system includes: configuring, at a logical load balancer, a traffic detector to detect traffic to a virtual internet protocol address (VIP) of an application having a plurality of instances; detecting, at the traffic detector, a first request to the VIP from a client executing in a virtual machine (VM) supported by a hypervisor executing on a first host; sending, by a configuration distributor of the logical load balancer in response to the detecting, a load balancer configuration to a configuration receiver of a local load balancer executing in the hypervisor for configuring the local load balancer to perform load balancing for the VIP at the hypervisor using the load balancer configuration.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 6 depicts the tunnel endpoint option set as a GENEVE option in embodiments.

DETAILED DESCRIPTION

Deploying a distributed load balancer in a virtualized computing system is described. In embodiments, a distributed load balancer (DLB) is a load balancer that includes components executing on the client side. There can be multiple clients accessing the load balanced service and accordingly multiple DLB instances. A DLB configuration needs to be provided to each DLB instance associated with each client. The DLB configuration can include, for example, a virtual Internet Protocol address (VIP) for the service, a server pool executing instances of the service, and algorithm parameters for load balancing. In embodiments, a centralized load balancer includes a traffic detector to detect traffic to the VIP. A configuration distributor in the centralized load balancer sends a DLB configuration to a configuration receiver of a local load balancer executing at the client in response to detecting traffic to the VIP. The local load balancer then performs load balancing for the VIP locally at the client based on the DLB configuration. These and further embodiments are described below with respect to the drawings.

Figure 1:
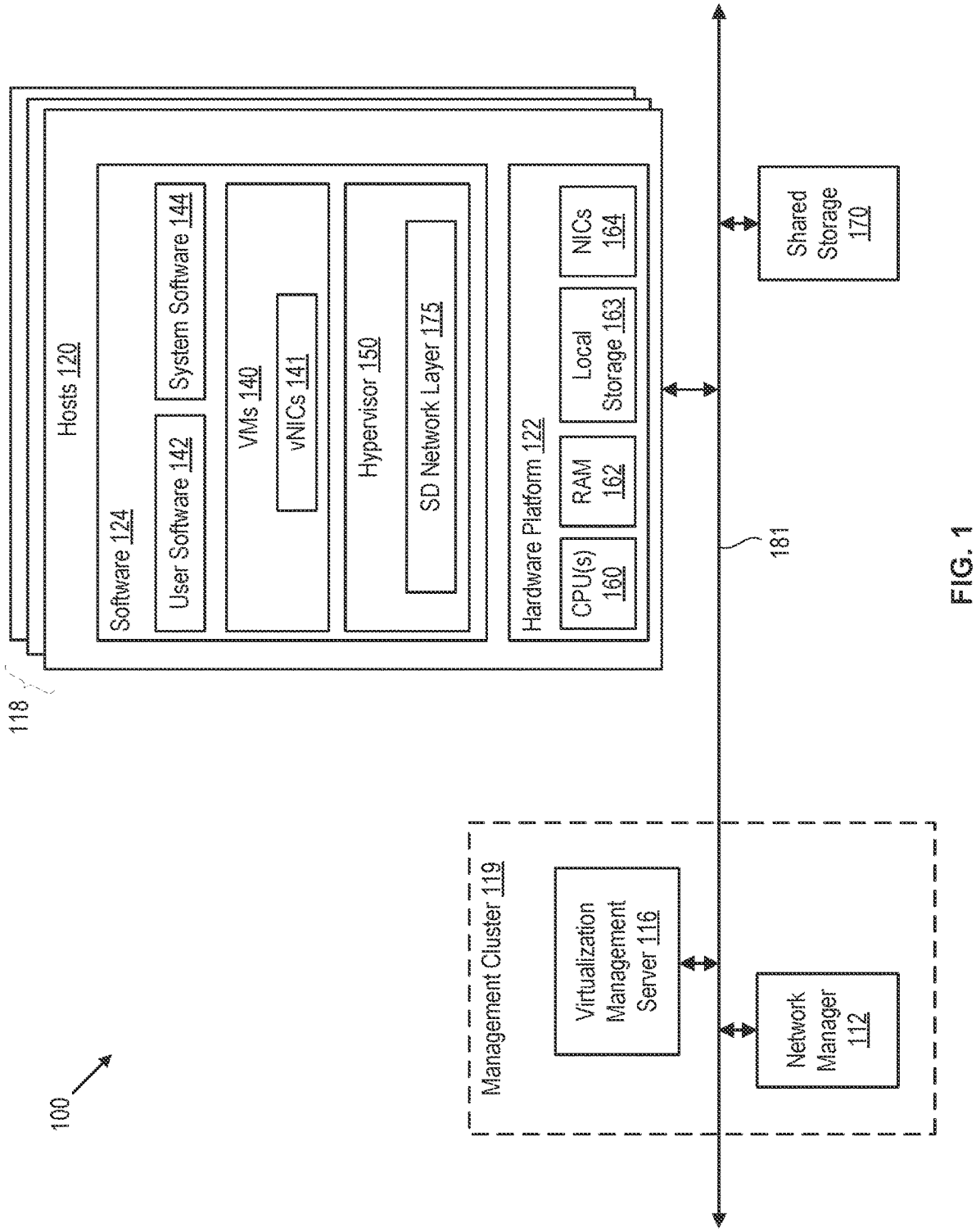
FIG. 1 is a block diagram of a virtualized computing system in which embodiments described herein may be implemented.

FIG. 1 is a block diagram of a virtualized computing system 100 in which embodiments described herein may be implemented. Virtualized computing system 100 includes hosts 120. Hosts 120 may be constructed on hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), a plurality of network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein). Physical network 181 can include a plurality of physical switches, physical routers, and like type network devices.

In the embodiment illustrated in FIG. 1, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like.

Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

Software 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. VMs 140 can execute software deployed by users (e.g., user software 142), as well as system software 144 deployed by management/control planes to provide support (e.g., virtualization management server 116 or network manager 112).

In embodiments, virtualized computing system 100 is configured with a software-defined (SD) network layer 175. SD network layer 175 includes logical network services executing on virtualized infrastructure in host cluster 118. A logical network is a network defined in software (as opposed to physical network 181). The virtualized infrastructure that supports the logical network services includes hypervisor-based components, such as resource pools, distributed switches, distributed switch port groups and uplinks, etc., as well as VM-based components (e.g., system software 144), such as router control VMs, load balancer VMs, edge servers, etc. Logical network services include logical switches and logical routers, as well as logical firewalls, logical virtual private networks (VPNs), logical load balancers, and the like, implemented on top of the virtualized infrastructure. VMs 140 include virtual NICs (vNICs) 141 connected to logical switch ports in SD network layer 175. Hypervisor 150 includes tunnel endpoints (TEPs) for encapsulating/decapsulating traffic traversing between hosts 120 on SD network layer 175 using a Layer 2-over-Layer 3 tunneling protocol, such as GENEVE, VXLAN, or the like. The encapsulated traffic traverses an overlay network supported by physical network 181 (the underlay network).

Virtualization management server 116 is a physical or virtual server that manages hosts 120 and the hypervisors therein. Virtualization management server 116 installs agent(s) in hypervisor 150 to add a host 120 as a managed entity. Virtualization management server 116 can logically group hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. In other embodiments, SD network layer 175 is orchestrated and managed by virtualization management server 116 without the presence of network manager 112. Virtualization management server 116 and network manager 112 can execute in a management cluster 119, which can include virtual and/or physical servers.

Figure 2:
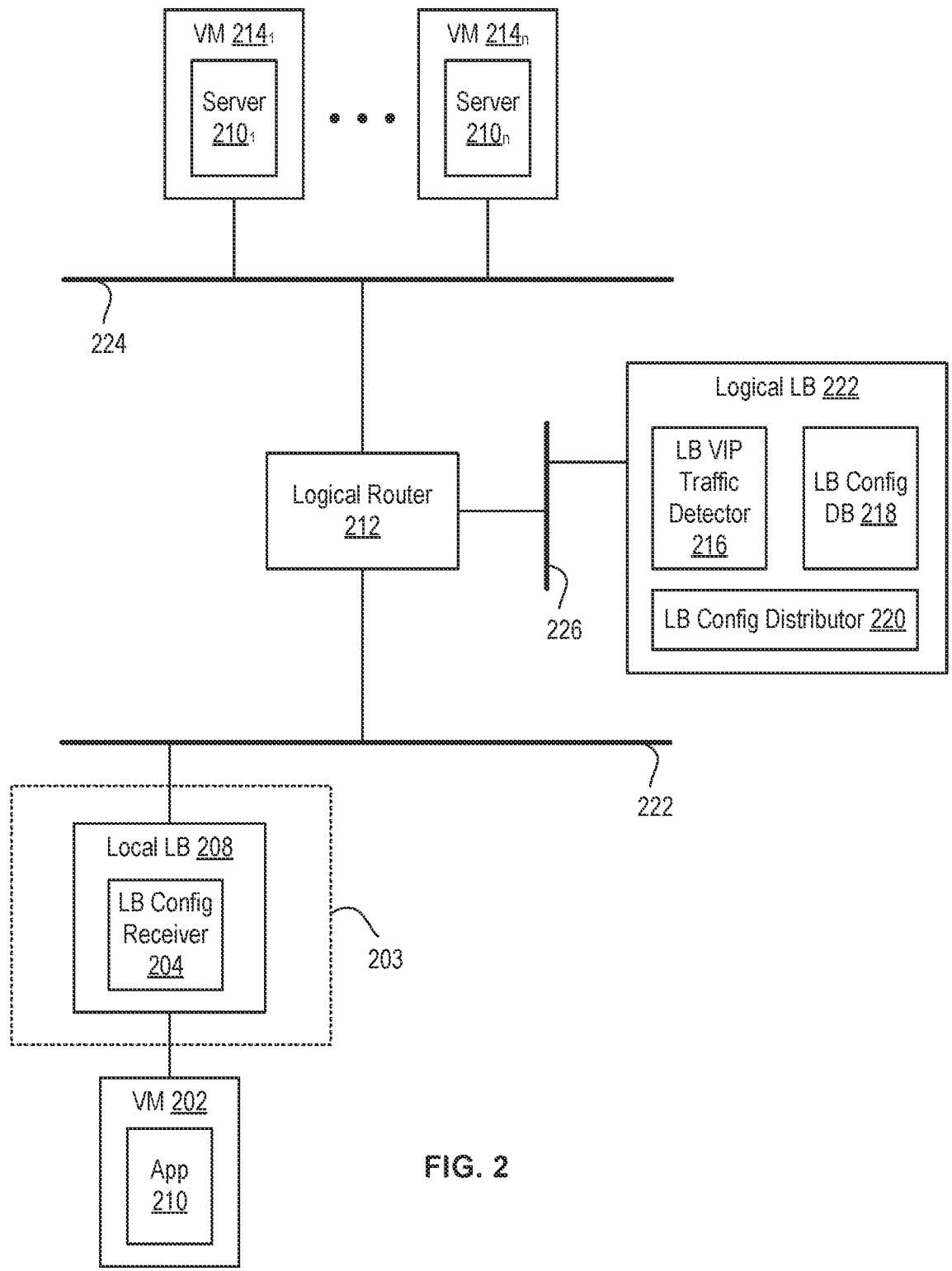
FIG. 2 is a block diagram depicting a distributed load balancer system according to embodiments.

FIG. 2 is a block diagram depicting a distributed load balancer system according to embodiments. In the embodiment, SD network layer 175 includes a logical router 212 and logical networks 222, 224, and 226. Logical router 212 is configured to route traffic among logical networks 222, 224, and 226. A group of VMs $214_1 \ldots 214_n$ (where n is an integer greater than zero, collectively VMs 214) are connected to logical network 224. Each of VMs 214 executes an instance of a backend server application ("server"). Accordingly, VMs $214_1 \ldots 214_n$ execute server instances $210_1 \ldots 210_n$, respectively, which are collectively server 210.

A logical load balancer (LB) 222 is connected to logical network 226. Logical LB 222 is configured to load balance requests targeting server 210 among its instances $210_1 \ldots 210_n$. A VM 202 is connected to logical network 222 and executes a client application ("app 210") that issues requests to server 210. VM 202 is supported by a hypervisor 203, which can include a local LB 208 executing as a component therein. Logical LB 222 is a centralized part of the distributed load balancer. Local LB 208 is a distributed part of the distributed load balancer and is configured dynamically by logical LB 222 as discussed below. Local LB 208 includes an LB configuration (config) receiver 204. Logical LB 222 includes an LB virtual internet protocol address (VIP) traffic detector 216, an LB configuration (config) database 218, and an LB configuration (config) distributor 220.

Figure 3:
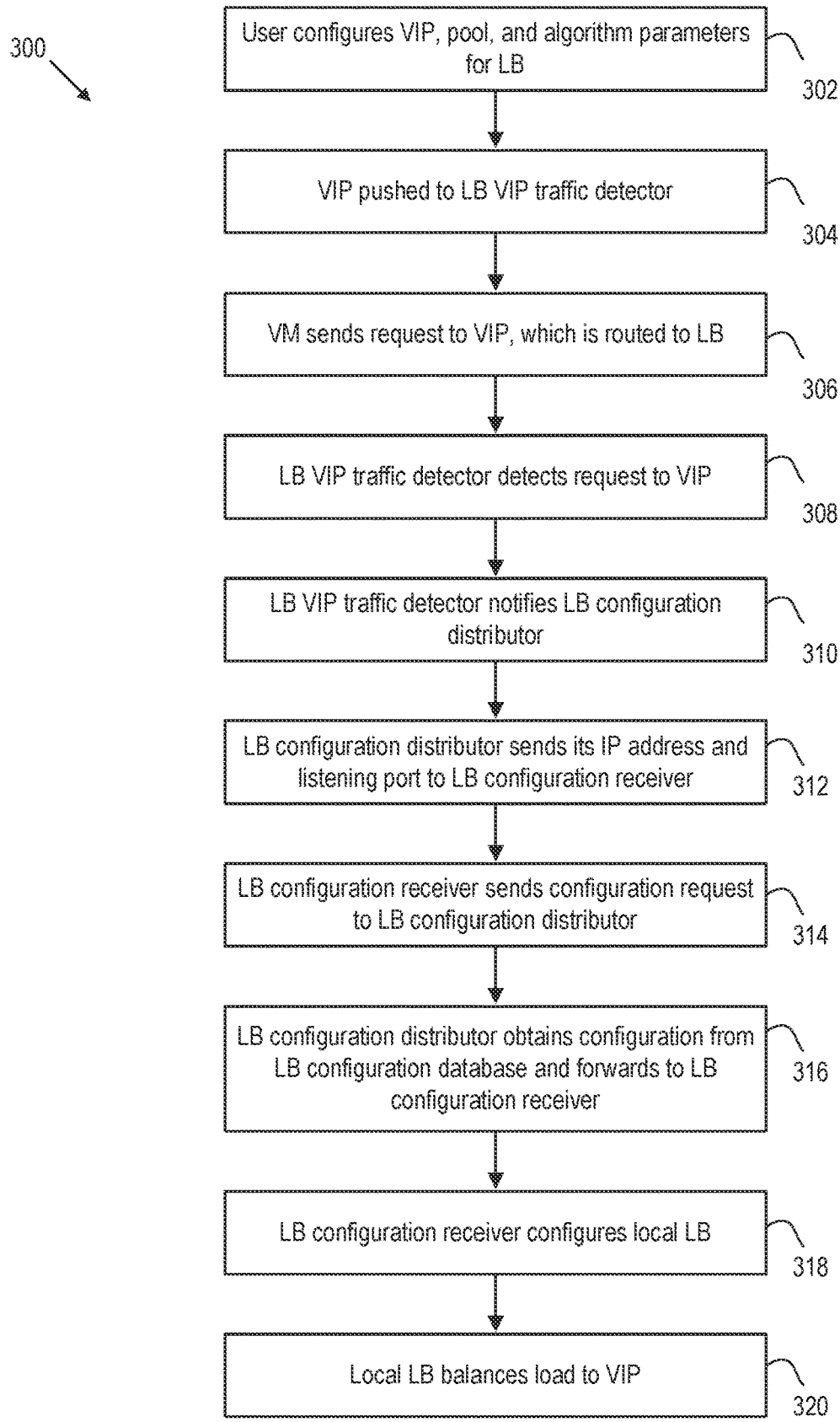
FIG. 3 is a flow diagram depicting a method of distributed load balancing according to embodiments.

FIG. 3 is a flow diagram depicting a method 300 of distributed load balancing according to embodiments. Method 300 may be understood with reference to the distributed load balancer system shown in FIG. 2. Method 300 begins at step 302, where a user configures a VIP, server pool, and algorithm parameters for the distributed load balancer ("LB configuration"). The LB configuration is stored in LB config DB 218 of logical LB 222. At step 304, logical LB 222 pushes the VIP to LB VIP traffic detector 216. LB VIP traffic detector 216 is then ready to detect traffic targeting the VIP.

At step 306, VM 202 sends a request to the VIP. At this time, local LB 208 is unconfigured and does not process the request from VM 202. Logical router 212 includes a route for routing traffic to the VIP to logical LB 222. At step 308, LB VIP traffic detector 216 detects the request with the destination IP of the VIP. At step 310, LB VIP traffic detector 216 notifies LB configuration distributor 220 that VM 202 has sent a request to the VIP, which has been routed to logical LB 222. This indicates that local LB 208 has yet to be configured and is not performing local load balancing for this VIP.

At step 312, LB configuration distributor 220 sends its IP address and listening port to LB configuration receiver 204 of local LB 208. At step 314, LB configuration receiver 204 sends a configuration request to LB configuration distributed 220 using the IP address and listening port information. At step 316, LB configuration distributor 220 obtains the LB configuration from LB config DB 218 and forwards the LB configuration to LB configuration receiver 204. At step 318, LB configuration receiver 204 configures local LB 208 using the LB configuration. At this time, local LB 208 is configured and able to perform active load balancing for the VIP locally in hypervisor 203. At step 320, local LB 208 performs load balancing for additional requests to VIP from VM 202. While only one VM 202 is shown, hypervisor 203 can support multiple VMs each sending requests to the VIP. After configuration, local LB 208 performs load balancing for all such VMs. Upon receiving a request to the VIP, local LB 208 will select a server instance 210 for the request. Hypervisor 203 then sends the request to the selected server instance 210. Once local LB 208 is configured, requests to the VIP are not routed to logical LB 222. Configuration of local LB 208 is dynamic and does not require the admin to statically configure certain hypervisors with the LB configuration on a manual basis.

Figure 4:
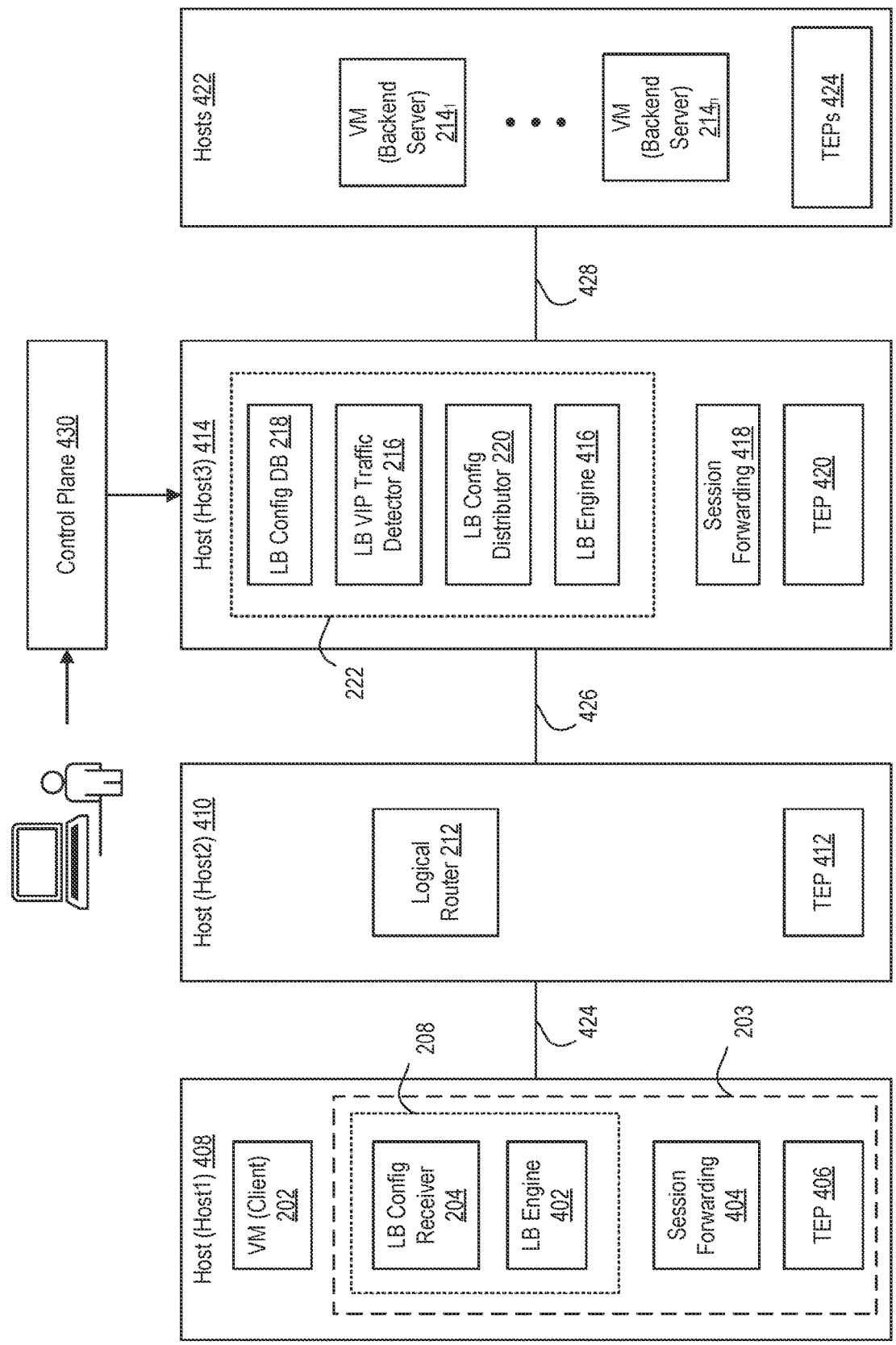
FIG. 4 is a block diagram depicting a distributed load balancer system according to additional embodiments.

FIG. 4 is a block diagram depicting a distributed load balancer system according to additional embodiments. Elements in FIG. 4 that are the same or similar to those of FIG. 2 are designated with identical reference numerals. A host 408 ("host1") executes hypervisor 203 having local LB 208. Local LB 208 includes LB configuration receiver 204 and an LB engine 402. Hypervisor 203 further includes session forwarding 404 and a TEP 406. VM 202 ("client") executes in host 408 supported by hypervisor 203.

In the embodiment, a host 410 ("host2") executes a logical router 212 and includes a TEP 412. A host 414 executes logical LB 222 and includes session forwarding 418 and TEP 420. Logical LB 222 includes LB config DB 218, LB VIP traffic detector 216, LB config distributor 220, and an LB engine 416. Hosts 422 execute VMs 214 ("backend servers") and include TEPs 424. A user can interact with a control plane 430 to configure the distributed load balancer. Control plane 430 can be provided by network manager 112.

Figure 5:
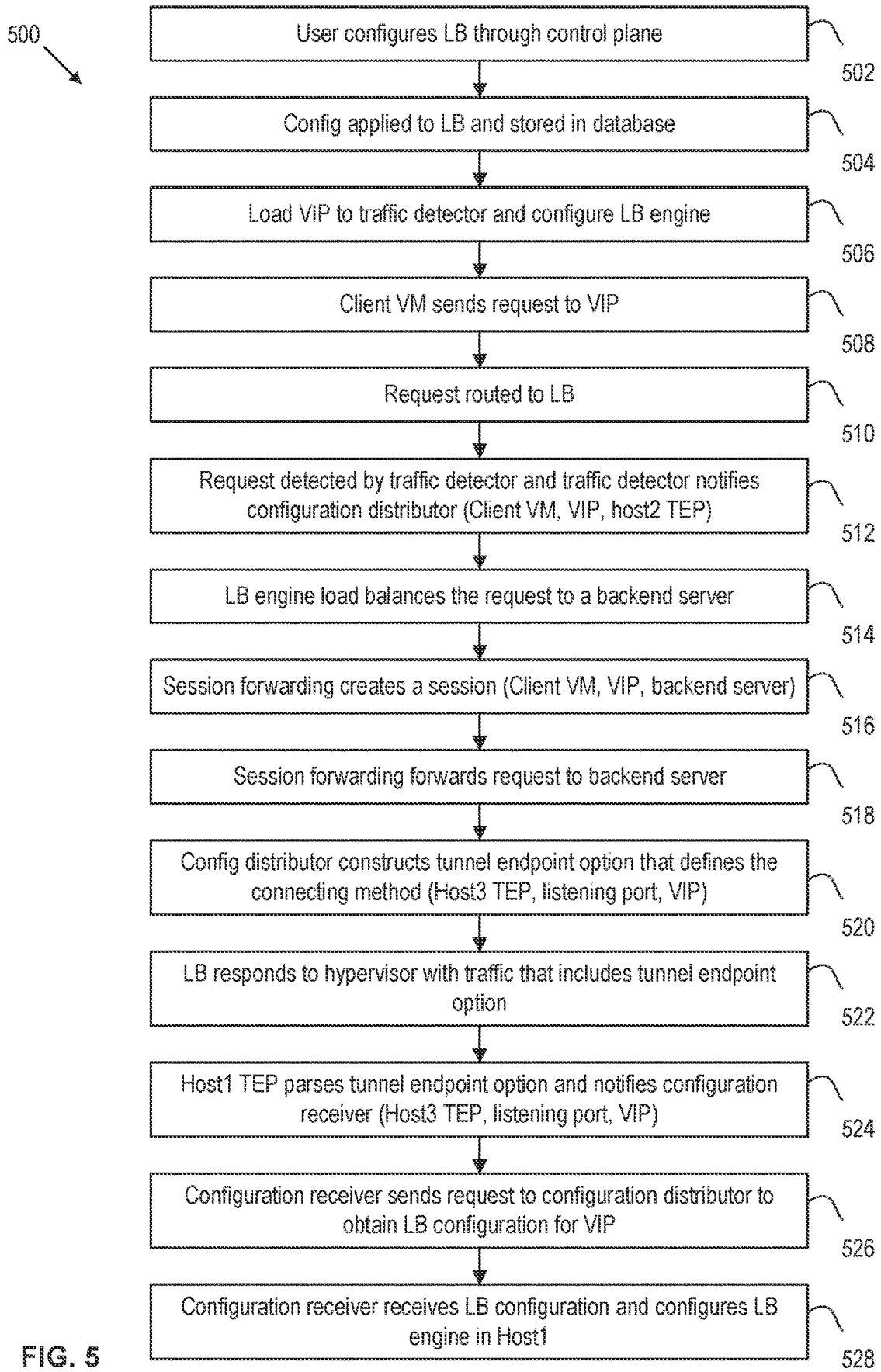
FIG. 5 is a flow diagram depicting a method of distributed load balancing according to embodiments.

FIG. 5 is a flow diagram depicting a method 500 of distributed load balancing according to embodiments. Method 500 may be understood with reference to the distributed load balancer system shown in FIG. 4. Method 500 begins at step 502, where the user configures logical LB 222 through control plane 430. The LB configuration includes the VIP, server pool (VMs 214), and algorithm parameters for load balancing. At step 504, the LB configuration is applied to logical LB 222 and is stored in LB config DB 218. At step 506, logical LB 222 loads the VIP to LB VIP traffic detector 216. LB VIP traffic detector 216 is then configured to detect requests with the VIP as the destination address. In addition, the LB configuration is loaded to LB engine 418. LB engine 416 is then ready to balance traffic from the VIP to the backend servers.

At step 508, VM 202 sends a request to the VIP. The request is tunneled and forwarded by TEP 406 in host 408 to TEP 412 in host 410. At step 510, logical router 212 routes the request to logical LB 222. The request is tunneled and forwarded by TEP 412 to TEP 420. At step 512, upon reaching logical LB 222, LB VIP traffic detector 216 detects the request to the VIP and notifies LB config distributor 420. The notification includes the VM identifier, the VIP, and a TEP (e.g., VM 202, the VIP, and TEP 412). At step 514, LB engine 416 load balances the request and selects a backend server among VMs 214 to service the request. At step 516, session forwarding 418 creates a session for the request (e.g., VM 202, VIP, selected backend server). At step 518, session forwarding 428 forwards the request to the selected backend server. The request is tunneled from TEP 420 to a TEP 424 and forwarded to the selected backend server.

In response to the notification, at step 520, LB configuration distributor 220 constructs a tunnel endpoint option that defines the connecting method. The tunnel endpoint option can include the IP address of TEP 420, the listening port for LB configuration distributor 220, and the VIP. In embodiments, the tunnel endpoint option is set as a GENEVE option as shown in FIG. 6.

In the example, the GENEVE option includes the distributor IP (e.g., IP of TEP 420), the virtual IP (VIP), and the distributor port (the port on which LB configuration distributor 220 is listening.)

At step 522, logical LB 222 responds to hypervisor 203 with traffic that includes the tunnel endpoint option. The traffic is carried to TEP 412 and then routed to TEP 406. At step 524, TEP 406 parses the tunnel endpoint option and notifies LB configuration receiver 204 of the connecting method (IP of TEP 420, listening port, VIP). At step 526, LB configuration receiver 204 sends a configuration request to LB configuration distributor 220 to obtain the LB configuration for the VIP. At step 528, LB configuration distributor 220 provides the LB configuration to LB configuration receiver 204, which configures LB engine 402 of local LB 208 in hypervisor 203. Once configured, local LB 208 balances requests to the VIP locally in hypervisor 203. The session for the initial request that triggered configuration of local LB 208 continues to be load balanced by logical LB 222 until such session is closed. Session forwarding 404 creates sessions for new requests after being load balanced by local LB 208 directly with the selected backend servers.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of distributed load balancing in a virtualized computing system, comprising:
    configuring, at a logical load balancer, a traffic detector to detect traffic to a virtual internet protocol address (VIP) of an application having a plurality of instances, the logical load balancer being a centralized part of a distributed load balancer;
    detecting, at the traffic detector, a first request to the VIP from a client executing in a virtual machine (VM) supported by a hypervisor executing on a first host; and
    sending, by a configuration distributor of the logical load balancer in response to the detecting, a load balancer configuration to a configuration receiver of a local load balancer executing in the hypervisor for configuring the local load balancer to perform load balancing for the VIP at the hypervisor using the load balancer configuration, the local load balancer being a distributed part of the distributed load balancer.

2. The method of claim 1, wherein the logical load balancer load balances the first request from the client, and wherein the local load balancer load balances at least one additional request from the client or load balances one or more requests from another VM supported by the hypervisor.

3. The method of claim 1, further comprising:
    sending, by the traffic detector, a notification to the configuration distributor in response to detecting the request;
    sending, by the configuration distributor, a connecting method to the configuration receiver; and
    requesting, by the configuration receiver, the load balancer configuration from the configuration distributor using the connecting method.

4. The method of claim 1, further comprising:
    receiving, at the logical load balancer, the load balancer configuration through a control plane as defined by a user; and
    storing the load balancer configuration in a database of the logical load balancer.

5. The method of claim 1, wherein the logical load balancer executes in a second host connected to the first host by a network, and wherein the instances of the application execute in at least one additional host connected to the first host and the second host by the network.

6. The method of claim 1, further comprising:
    configuring, based on the load balancer configuration, a load balancer engine of the logical load balancer.

7. The method of claim 6, further comprising:
    configuring, by the configuration receiver based on the load balancer configuration, a load balancer engine of the local load balancer.

8. A non-transitory computer readable medium comprising instructions to be executed in a computing device to cause the computing device to carry out a method of distributed load balancing in a virtualized computing system, comprising:
    configuring, at a logical load balancer, a traffic detector to detect traffic to a virtual internet protocol address (VIP) of an application having a plurality of instances, the logical load balancer being a centralized part of a distributed load balancer;
    detecting, at the traffic detector, a first request to the VIP from a client executing in a virtual machine (VM) supported by a hypervisor executing on a first host; and
    sending, by a configuration distributor of the logical load balancer in response to the detecting, a load balancer configuration to a configuration receiver of a local load balancer executing in the hypervisor for configuring the local load balancer to perform load balancing for the VIP at the hypervisor using the load balancer configuration, the local load balancer being a distributed part of the distributed load balancer.

9. The non-transitory computer readable medium of claim 8, wherein the logical load balancer load balances the first request from the client, and wherein the local load balancer load balances at least one additional request from the client or load balances one or more requests from another VM supported by the hypervisor.

10. The non-transitory computer readable medium of claim 8, further comprising:
    sending, by the traffic detector, a notification to the configuration distributor in response to detecting the request;
    sending, by the configuration distributor, a connecting method to the configuration receiver; and
    requesting, by the configuration receiver, the load balancer configuration from the configuration distributor using the connecting method.

11. The non-transitory computer readable medium of claim 8, further comprising:
    receiving, at the logical load balancer, the load balancer configuration through a control plane as defined by a user; and
    storing the load balancer configuration in a database of the logical load balancer.

12. The non-transitory computer readable medium of claim 8, wherein the logical load balancer executes in a second host connected to the first host by a network, and wherein the instances of the application execute in at least one additional host connected to the first host and the second host by the network.

13. The non-transitory computer readable medium of claim 8, further comprising:

configuring, based on the load balancer configuration, a load balancer engine of the logical load balancer.

14. The non-transitory computer readable medium of claim 13, further comprising:
configuring, by the configuration receiver based on the load balancer configuration, a load balancer engine of the local load balancer.

15. A virtualized computing system, comprising:
a first host configured to executing a logical load balancer, the logical load balancer including a traffic detector configured to detect a virtual internet protocol address (VIP) of an application having a plurality of instances, the logical load balancer being a centralized part of a distributed load balancer; and
a second host configured to execute a hypervisor and a virtual machine (VM) supported by the hypervisor, the hypervisor including a local load balancer, the local load balancer being a distributed part of the distributed load balancer;
wherein the traffic detector is configured to detect a first request to the VIP from a client executing in the VM;
wherein a configuration distributor of the logical load balancer sends, in response to detecting the request, a load balancer configuration to a configuration receiver of the local load balancer; and
wherein the configuration receiver configures the local load balancer to perform load balancing for the VIP at the hypervisor using the load balancer configuration.

16. The virtualized computing system of claim 15, wherein the logical load balancer load balances the first request from the client, and wherein the local load balancer load balances at least one additional request from the client or load balances one or more requests from another VM supported by the hypervisor.

17. The virtualized computing system of claim 15, wherein the traffic detector is configured to send a notification to the configuration distributor in response to detecting the request, wherein the configuration distributor is configured to send a connecting method to the configuration receiver, and wherein the configuration receiver is configured to request the load balancer configuration from the configuration distributor using the connecting method.

18. The virtualized computing system of claim 15, wherein the logical load balancer is configured to receive the load balancer configuration through a control plane as defined by a user, and wherein the load balancer configuration is stored in a database of the logical load balancer.

19. The virtualized computing system of claim 15, wherein the logical load balancer executes in a second host connected to the first host by a network, and wherein the instances of the application execute in at least one additional host connected to the first host and the second host by the network.

20. The virtualized computing system of claim 15, wherein a load balancer engine of the logical load balancer is configured with the load balancer configuration, and wherein a load balancer engine of the local load balancer is configured by the configuration receiver with the load balancer configuration.

* * * * *